(12) United States Patent
Walz

(10) Patent No.: US 7,068,456 B2
(45) Date of Patent: Jun. 27, 2006

(54) METHOD AND APPARATUS FOR PROVIDING MULTIPLE POWER AND PERFORMANCE STATUS FOR A SPINNING MEDIA

(75) Inventor: Michael C. Walz, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 10/315,441

(22) Filed: Dec. 10, 2002

(65) Prior Publication Data

US 2004/0109255 A1      Jun. 10, 2004

(51) Int. Cl.
*G11B 15/46* (2006.01)

(52) U.S. Cl. .................................... 360/73.03
(58) Field of Classification Search ............. 360/73.03, 360/69, 71, 75; 369/53; 713/323, 310; 318/641
See application file for complete search history.

(56) References Cited

U.S. PATENT DOCUMENTS

| | | | | |
|---|---|---|---|---|
| 5,544,138 | A * | 8/1996 | Bajorek et al. .......... | 369/53.42 |
| 5,682,273 | A * | 10/1997 | Hetzler ........................ | 360/75 |
| 5,760,563 | A * | 6/1998 | Bennett et al. ............. | 318/641 |
| 5,774,292 | A * | 6/1998 | Georgiou et al. ........ | 360/73.03 |
| 5,898,880 | A * | 4/1999 | Ryu ........................... | 713/323 |
| 5,915,120 | A * | 6/1999 | Wada et al. ................ | 713/310 |
| 5,964,878 | A * | 10/1999 | Ryu ........................... | 713/323 |
| 5,982,570 | A * | 11/1999 | Koizumi et al. ............. | 360/69 |
| 6,633,450 | B1 * | 10/2003 | Kaneko .................... | 360/73.03 |

* cited by examiner

*Primary Examiner*—K. Wong
(74) *Attorney, Agent, or Firm*—Marshall, Gerstein & Borun LLP

(57) ABSTRACT

A method and device for controlling power consumption in a computer having a storage device including a motor and a storage medium is disclosed. The method comprises supplying a first power level to the motor of the storage device to spin the storage medium at a first rotational velocity, detecting a first predetermined condition and responsive to the detection of the first predetermined condition, supplying a second power level to the motor of the storage device to spin the storage medium at a second rotational velocity. A number of user defined preferences and system conditions in the computer may be taken into account in determining the second power level to the storage medium.

38 Claims, 7 Drawing Sheets

METHOD AND APPARATUS FOR PROVIDING MULTIPLE POWER AND PERFORMANCE STATUS FOR A SPINNING MEDIA

TECHNICAL FIELD

Computer data storage devices, and more specifically, to circuits and systems used in computer data storage devices for operating storage media under different power supply conditions are disclosed.

BACKGROUND

The clear trend in the computer industry today is toward the further development of portable computer systems. For example, notebook computers, laptop computers, and personal data assistants (PDA) are becoming increasingly popular and have already enjoyed widespread success in the marketplace. In many cases, these computer systems are designed to operate utilizing a power supply generated by a battery. Storage devices in laptop and notebook computer systems, such as disk drives, consume a significant amount of power when in operation. For example, a 2.5" disk drive may consume up to 20% of total system power while a 1.8" drive may consume up to 15%. Because of the continuous power drain associated with battery-powered systems there has been an emphasis on developing circuits and systems which are either capable of operating storage devices at reduced power levels, or which feature a low-power mode of operation of the storage devices.

The primary power management technique for power management in using disk drives in computers is the use of several reduced-power or power-save operating modes, each mode being entered following time out of a fixed predetermined time period since a disk drive read or write operation. For example, at the end of a fixed time period since the user last wrote data to the disk or read data from the disk, the read/write heads are moved to their parking location and the disk drive spindle motor is shut off. When the user next accesses the disk drive, the spindle motor is spun up and the heads are moved across the disk to read or write data on the appropriate data track.

The primary disadvantage of such a power-save mode is the time delay in exiting the mode, during which the user must wait. Such delay greatly affects the performance of the computer. Typically, the lengths of the fixed time periods are set by the computer user through software. However, fixed times for entering power-save modes are a poor tradeoff between energy and performance since there is no responsiveness to the user workload. The user must change the fixed times in anticipation of the workload, and the selection of times too short or too long can adversely impact performance and energy consumption. Moreover, this approach (typically performed in software external to the disk controller) suffers from a number of disadvantages, such as: a) there is a considerable time delay for a disk drive in the off state to come up to speed (typically on the order of a few seconds—a delay that may in some circumstances be unacceptable to many users); b) there is considerable power required to bring a disk drive from an off state up to speed (which in some circumstances, may offset the benefits of de-powering it); and c) frequent de-powering/re-powering of a drive increases its likelihood of failure. Thus, it is apparent that fixed times for entering power-save modes are a poor tradeoff between energy and performance since there is no responsiveness to the user workload or the condition of power source.

DETAILED DESCRIPTION OF THE PRESENTLY PREFERRED EMBODIMENTS

Figure 1:
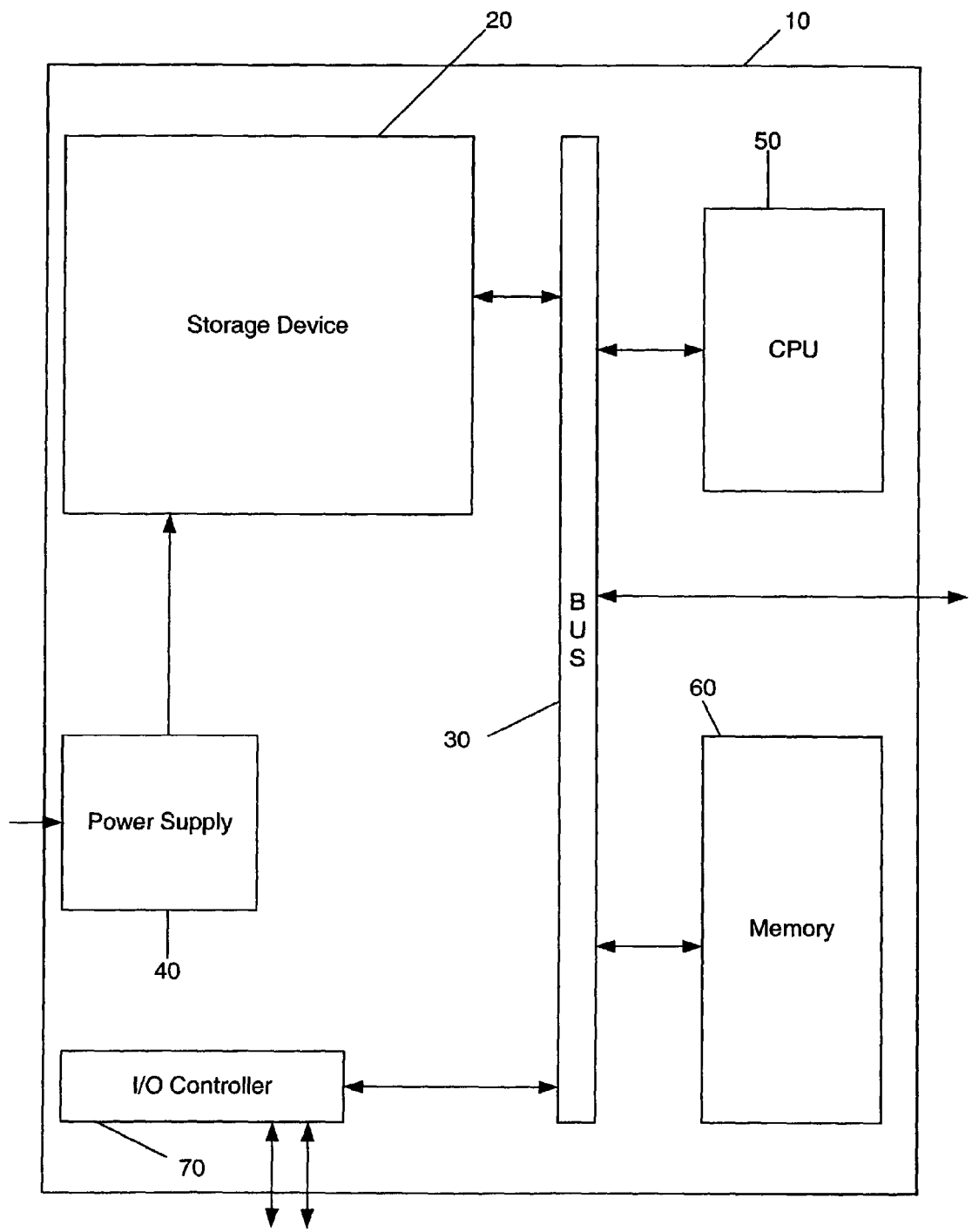
FIG. 1 is a block diagram of computer using a storage device in accordance with this disclosure.

FIG. 1 is a block diagram of an example computer 10 using a storage device constructed in accordance with the teachings of this diclosure. As used herein "computer" refers to any computer (e.g., portable computer, laptop computer, PDA, desktop computer, server, etc.) that employs any type of spinning medium storage device. The computer 10 of the illustrated example contains many conventional hardware components of a computer. Thus, as shown in FIG. 1, the computer 10 includes various components including a storage device 20, a communications bus 30, a power supply 40, a central processing unit (CPU) 50, a memory 60, and an input-output controller 70. Even though the illustrated example of the computer 10 shows these components internal to the computer 10, a person of ordinary skill in the art will appreciate that some of these components can alternatively be external to the computer 10.

The storage device of 20 may be any of the various storage devices used with a computer such as, an internal disc drive (also known as hard drive), an external disc drive (also known as floppy disc drive), a compact disc (CD) drive, etc. The storage device 20 is further described in more detail in FIG. 2.

The computer 10 also includes a communication bus 30. The communications bus 30 is used to communicate information between various components within the computer 10 as well as to communicate with communication channels outside the computer 10, such as an Ethernet®, a digital subscriber line (DSL), etc. The communications bus 30 may be implemented using any commercially available bus architecture such as a peripheral communication interconnect (PCI), etc.

The illustrated example computer 10 employs a power supply 40. Such a power supply could be provided by either internal power (e.g., a battery) or external power (e.g., a commercial power via an AC adapter). If the computer 10 uses external power, the power supply 40 may include a power condition circuit (not shown here) for rectifying, smoothing and stepping the input voltage received by the power supply 40 to a desired direct current (DC) level. The power supply 40 is operatively connected to the storage device 20 as well as to a number of other components in the computer 10 (e.g., the CPU 50, the memory 60, etc., as is conventional).

The CPU 50 is used to manage various resources and processes within the computer 10. The CPU 50 can be implemented, for example, by one or more microprocessors from the Pentium®, Itanium®, or XScale™ family of Intel® microprocessors, PowerPC® family of Motorola® microprocessors. The memory 60 is used to store data and/or software. It typically includes a volatile memory used to store information temporarily while the computer 10 is in use. The volatile memory may be implemented by any type of random access memory device such as SDRAM, DRAM, RAMBUS, etc., or any other type of memory used in computers. The memory 60 may also include non-volatile memory, implemented by any known type of read-only memory (ROM) such as flash memory, EPROM, etc.

The illustrated computer 10 also includes an input-output controller 70 that communicates with a number of input and output devices. The input device(s) permit a user to enter data and commands into the CPU 50. The input device(s) can be implemented by, for example, a keyboard, a mouse, a touch-screen, a track-pad, a trackball, etc. The output device(s) can be implemented, for example, by any display device such as a printer, a speaker, a monitor, etc.

Figure 2:
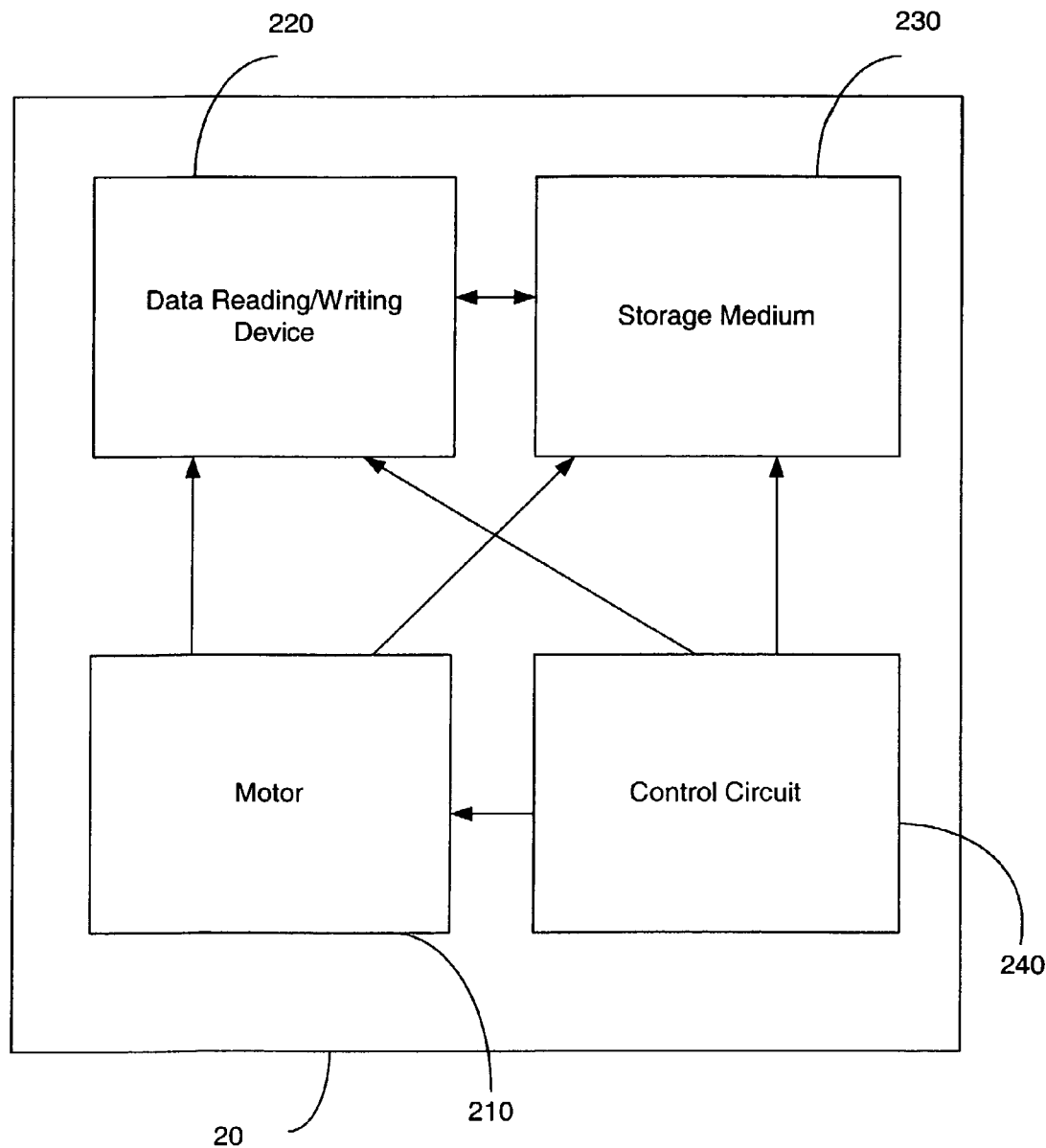
FIG. 2 is a block diagram of the storage device of FIG. 1.

Referring now to FIG. 2, the storage device 20 of the illustrated computer 10 comprises a motor 210, a data reading/writing device 220, a storage medium 230 and a control circuit 240. The motor 210 operates to spin the storage medium 230 of the storage device 20 at a rotational velocity dictated by the voltage and the current supplied to the motor 210. The motor 210 can be implemented by any conventional motor used in computer storage devices such as a uni-polar stepper motor, a multi-phase stepper motor, a spindle motor, etc. One or more additional motors may also be operatively connected to the data reading/writing device 220 to move the reading/writing device 220 to read or write data from the storage medium 230. The storage medium 230 can be a magnetic storage medium, an optical storage medium, or any other type of storage medium used to store data. The control circuit 240 of the storage device 20 is described in further detail in FIG. 3.

Figure 3:
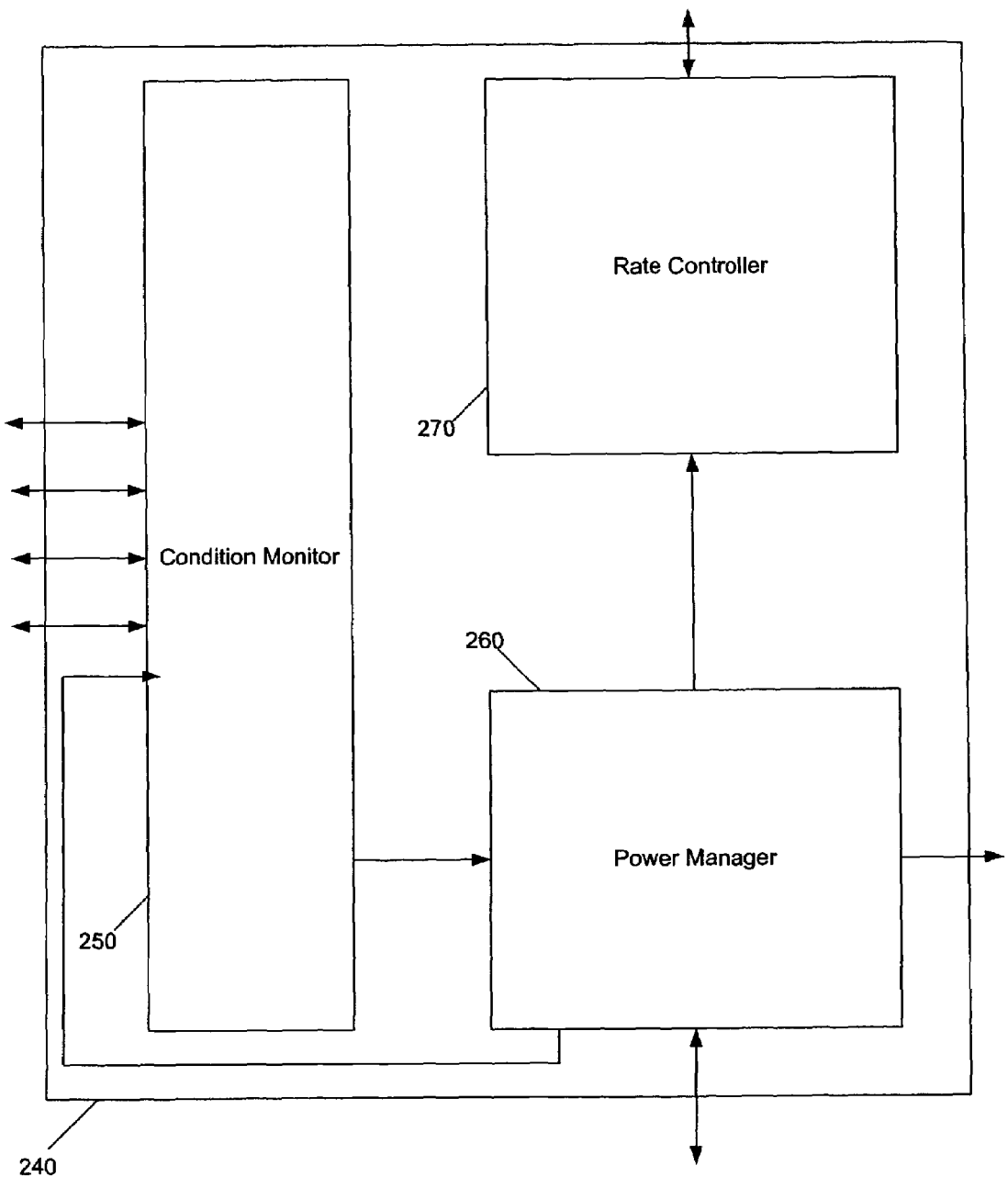
FIG. 3 is a block diagram of the control circuit for the storage device of FIG. 2.

In the example, illustrated in the FIG. 3, the control circuit 240 comprises a condition monitor 250, a power manager 260 and a rate controller 270. The control circuit 240 may be implemented using hardware, software, firmware, or any combination thereof. Moreover, each of the components of the control circuit 240 may be implemented together on one board of hardware architecture or they may be implemented on a number of different boards and interconnected to each other by communication circuits. However, in the preferred implementation, the control circuit 240 is implemented by a microprocessor, and each of the condition monitor 250, the power manager 260 and the rate controller 270 is implemented as software. Alternatively, all or some of the components of the control circuit 240 may be implemented as part of the CPU 50.

In one example of the control circuit 240, the condition monitor 250 is implemented to provide input signals directly to the rate controller 270 and to the power manager 260 such that the power manager 260 controls the motor 210 and power supply 40 based on the input signal received from the condition monitor 250. Alternatively, the control circuit 240 may also be implemented such that the condition monitor 250 directly provides input signals to the power supply 40 and the motor 210. The functioning of the condition monitor 250 is further described in FIG. 4.

In the illustrated example in FIG. 3, the condition monitor 250 receives a number of inputs from various parts of the computer 10 and from a user using the computer 10. For example the condition monitor 250 of FIG. 3 receives an input signal from the power supply 40, from the CPU 50, the power manager 260, and from the user through the input-output controller 70, etc. The condition monitor 250 of the illustrated example in FIG. 3 comprises a number of modules to process various signals input to it. Based on these input signals, the condition monitor 250 generates a number of control signals that are output to various devices in computer 10.

In the illustrated example of the control circuit 240, the power manager 260 is operatively connected to the power supply 40, the condition monitor 250, the rate controller 270 and the motor 210 in the storage device 20. The power manager 260 monitors the quality, the quantity and the presence of power available from the power supply 40. In the illustrated example, the power manager 260 receives input signals from the condition monitor 250. The power manager 260 also provides signals to the rate controller 270, the power supply 40 and the motor 210. Based on the input signal received from the condition monitor 250, the power manager 260 sets the level of power delivered by the power supply 40 to the motor 210. In one example, the power manager 260 may set the level of power delivered by the power supply 40 to the motor 210 by controlling the level of voltage delivered by the power supply 40 to the motor 210. In an alternate example, the motor 210 may be designed to have a distinct set of operating points or performing states where each state relates a specific voltage from the power supply 40 with a specific rotational speed of the motor 210. For example, at one such state, the motor 210 may spin the data reading/writing device 220 at a speed of 5400 revolutions per minute (RPM) when a voltage of 5 v is applied from the power supply 40, whereas the speed of the motor 210 can reach only up to 4800 RPM when a voltage of only 3.3 v is applied by the power supply 40.

In the illustrated example, the rate controller 270 is operatively connected to the data reading device 220. In an alternate example the rate controller 270 may also be connected to a data writing device (not shown here). Based on the input signal received from the power manager 260 the rate controller 270 adjusts the rate of the operation of the data reading device 220 (or data writing device). The rate controller 270 can be implemented using either hardware, firmware or software technology, or combination of any of them. In the illustrated example, the rate controller 270 adjusts the rate of operation of the data reading device 220 such that the operation of the data reading device 220 is synchronized with the speed of rotation of motor 210.

Figure 4:
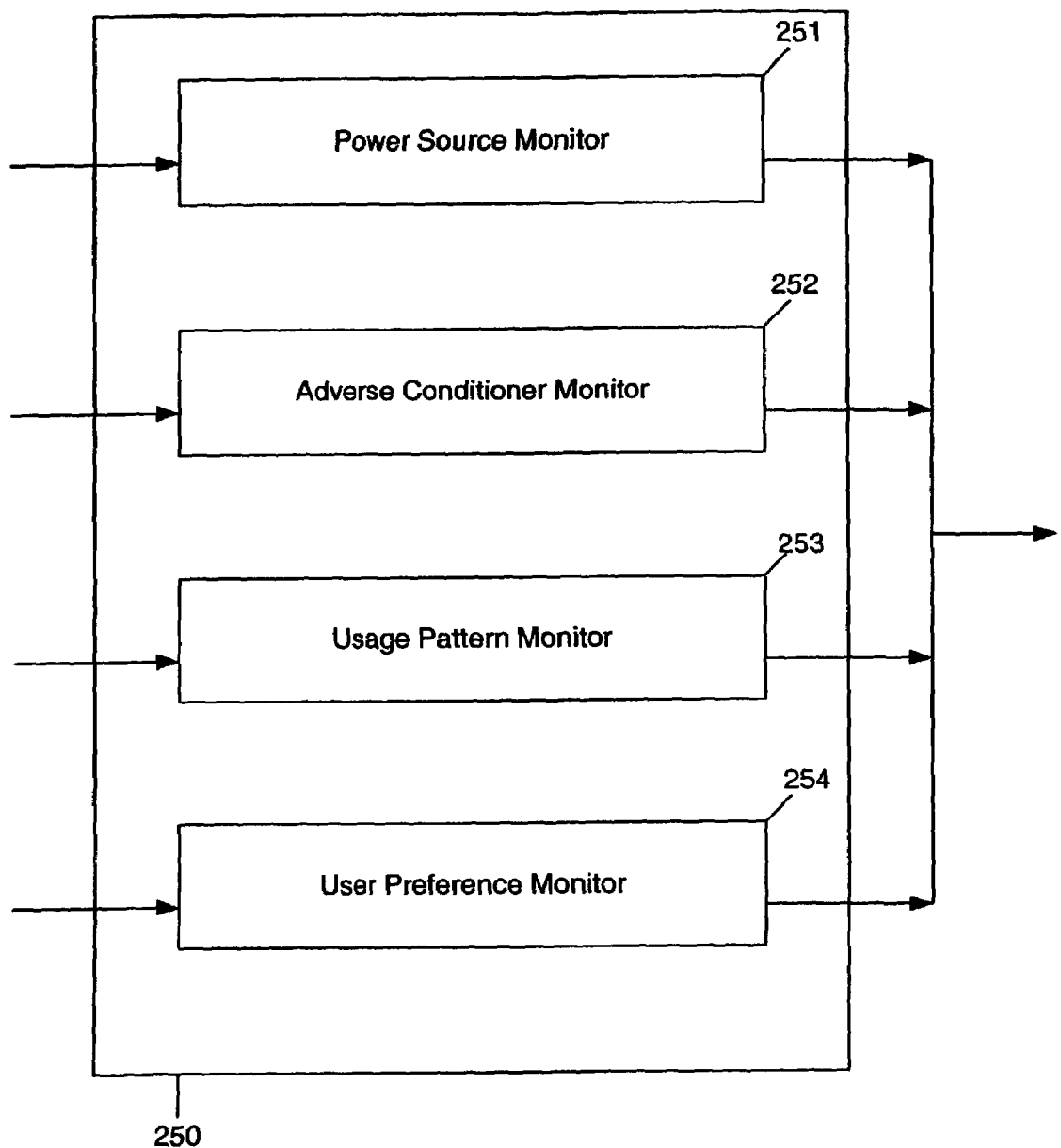
FIG. 4 is a block diagram of the condition monitor of FIG. 3.

Now referring to FIG. 4, the example of the condition monitor 250 illustrated in FIG. 4 contains a power source monitor 251, an adverse condition monitor 252, a usage pattern monitor 253 and a user preference monitor 254. The power source monitor 251 processes input signals from the power supply 40, the power manager 260 and the CPU 50 to generate various output signals that are fed to the rate controller 270 and the power manager 260. To generate these output signals the power source monitor 251 may use an algorithm using various predetermined criteria.

An example of such a criteria may be that if the power supply 40 is an internal battery, the output signal to the power manager 260 signals the power manager 260 to operate the motor 210 at a certain first percentage of the certain maximum revolutions per minute (RPM), and the output signal to the rate controller 270 signals the rate controller 270 to operate the data reading device 220 at the same certain first percentage of the maximum data reading speed such that the data reading is synchronized with the speed of the motor 210. Such synchronization of the operation of the data reading device 220 with the speed of the motor 210 allows the motor 210 to be operated at optimum levels and hence reduce the amount of power used in data reading or writing.

Similarly, in another example if the power supply 40 is an internal battery, the power source monitor 251 may generate a signal to the CPU 50 to allocate a lesser percentage of processor time to data reading operation. In yet another example, the power source monitor 251 may also generate a signal to the communications bus 30 to set aside a lesser percentage of the communication bus bandwidth for data transfer to and from the data reading device 220. In yet another, the power source monitor 251 may output a signal to the input-output controller 70 to show an icon on a computer screen (not shown here) that informs the user about the percentage operating capacity of the data reading device.

The example of the condition monitor 250 illustrated in FIG. 4 also contains an adverse condition monitor 252. The adverse condition monitor 252 is designed to process any input signals that indicates an existence of an adverse condition regarding one or more components of the computer system 10. For example, the CPU 50 may send a signal to the condition monitor 250 that the system level temperature of the computer 10 is above or below one of a certain predetermined threshold levels. Alternatively, the power manager 260 may send a signal to the condition monitor 250 that the temperature of the motor 210 is above or below one of a certain predetermined threshold levels. Another example of an adverse condition may be a signal from the communication bus 30 signaling a lack of bandwidth on the communication bus 30 that requires that the level of data transfer from the data reading device 220 needs to be reduced. After processing these signals the adverse condition monitor 252 may generate a number of output signals that are input into the rate controller 270, the power manager 260, the CPU 50 and other devices in the computer 10.

In one example of the operation of the adverse condition monitor 252, a signal output to the power manager 260 may direct the power manager 260 to decrease the speed of the motor 210 so as to reduce the heat generated by the motor 210 while at the same time a signal output to the rate controller 270 may direct the rate controller 270 to reduce the speed of data reading device 220 so that the speed of the data reading operation is synchronized with the speed of the rotation of the motor 210. Such synchronization of the operation of the data reading device 220 with the speed of the motor 210 would allow the motor 210 to be operated at optimum levels and hence reduce the amount of power used in data reading or writing.

In another example of the operation of the adverse condition monitor 252, a signal output to the rate controller 270 may direct the rate controller 270 to increase the speed of the data reading device 220 so as to utilize available bandwidth on the communications bus 30, and simultaneously a signal output to the power manager 260 may direct the power manager 260 to increase the speed of the motor 210 so that the operation of the motor 210 is synchronized with the operation of the data reading device 220. The adverse condition monitor 252 may also send a signal to the input-output controller 70 to generate a pop-up window on a computer monitor (not shown here) to notify a computer user that an adverse condition has occurred and that the user must save all his work immediately, or that the system needs to be shutdown immediately.

The example of the condition monitor 250 illustrated in FIG. 4 also contains a usage pattern monitor 253. The usage pattern monitor 253 is adapted to collect, store and process various data regarding the usage of the storage device 20 and its components such as the motor 210, the data reading device 220, the storage medium 230, etc. The usage pattern monitor 253 may periodically collect signals from the motor 210 regarding the speed of the motor 210, the temperature of the motor 210, etc. It may also collect data from the storage medium 220 as to the location of data on the storage medium 220 that is read most or least often, the frequency of the read or write operation performed on the storage medium 220, etc. The usage pattern monitor 253 stores and analyzes these data to recognize usage patterns of the storage device 20 and its various components. Based on such an analysis, the usage pattern monitor 253 generates signals that may be used to control the motor 210, the data reading device 220, the power supply 40, etc. For example, the usage pattern monitor 253 may analyze data regarding the density of data in certain part of the storage medium 220 to direct the motor 210 to speed up or speed down when the data reading device is reading data from certain part of the storage medium 220, and simultaneously send a signal to the rate controller 270 to change the speed of the data reading device 220 so that the data reading operation is synchronized with the speed of the motor 210.

Similarly, the usage pattern monitor 253 may analyze a frequency of access to the storage medium 230 and generate a signal to direct the motor 210 to speed down when the frequency of access is low, or it may provide a signal to the CPU 50 regarding the low frequency of access to the data reading operation so that the CPU 50 can reduce the process time allocated to various data reading and data transfer operations. To store the data collected from various components of the storage device 20, the usage pattern monitor 253 may use the memory 60 where it can store the collected data and results of an analysis of such data.

The example of the condition monitor 250 illustrated in FIG. 4 also contains a user preference monitor 254. The user preference monitor 254 collects and processes various user preferences regarding the usage and operation of the storage device 20. In the illustrated example, the user preference monitor 254 collects input signals from the CPU 50, the computer memory 60 and the input-output controller 70. User preferences regarding usage and operation of the storage devices 20 may be stored on the computer memory 60 as permanent usage preferences, or they may be input to the condition monitor 250 by the input-output controller 70 in a real-time fashion.

A user may have stored a user preference on the memory 60 that the motor 210 should never be run at a speed higher than certain percentage of the maximum speed achievable when the power supply available is a battery power supply. Another example of a user preference may be that the speed of the motor 210 should be reduced to a certain level if the overall system temperature is over a certain predetermined threshold level. Alternatively, a user preference can be provided to the user preference monitor 254 on a temporary basis. For example, a user may feel that he needs to get certain data reading operation to be completed in a short period of time and may provide a temporary preference to the condition monitor 250 to maintain certain speed of the motor 210 regardless of the system level temperature or other constraints. Based on an analysis of the user preferences, the user preference monitor 254 may generate a signal that directs the power manager 260 to alter the speed of the motor 210, and it may also simultaneously generate another signal that directs the rate controller 270 to alter the speed of the data reading operation such that the operation of data reading is synchronized with the speed of the motor 210.

The modules 251 to 254 of the condition monitor 250 illustrated in FIG. 4 are examples of various modules contained in the condition monitor 250 used to generate control signals for the rate controller 270 and the power manager 260. In an alternate example, the condition monitor 250 may contain modules other than those described above. While FIG. 4 describes various components of the condition monitor 250 as being independent of each other, in an alternate example of the condition monitor 250, these modules may be connected to only some, all, or none of the other modules within the condition monitor 250.

The various modules of the condition monitor 250 can be implemented using a number of different hardware, software or firmware technologies. For example, the power source monitor 251 can be designed using a logic circuit employing a number of logic gates to embed the decision making process generating a first set of output signals for a given first set of input signals. Alternatively any of these modules 251 to 254 can be implemented using a software stored on a non-volatile memory such as an EPROM, etc., working along with one or more software stored in a volatile memory such as a RAM, etc. An example of a software implementation of the condition monitor 250 implementing one or more of the modules 251 to 254 is illustrated in FIGS. 5A–5C.

Figure 5A:
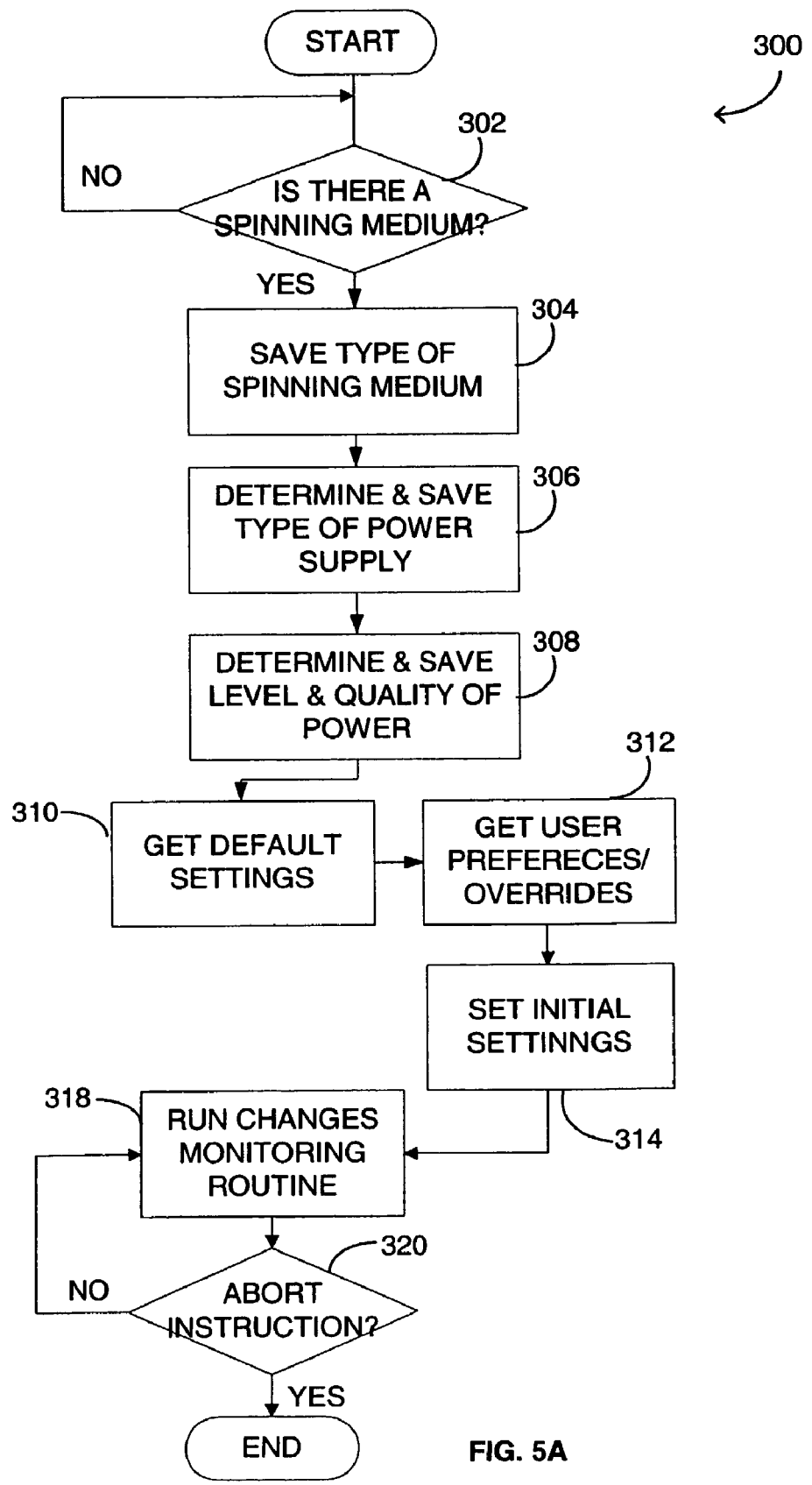
FIGS. 5A–5C are flowcharts illustrating an example computer software program executed by the control circuit of FIG. 2.
Figure 5B:
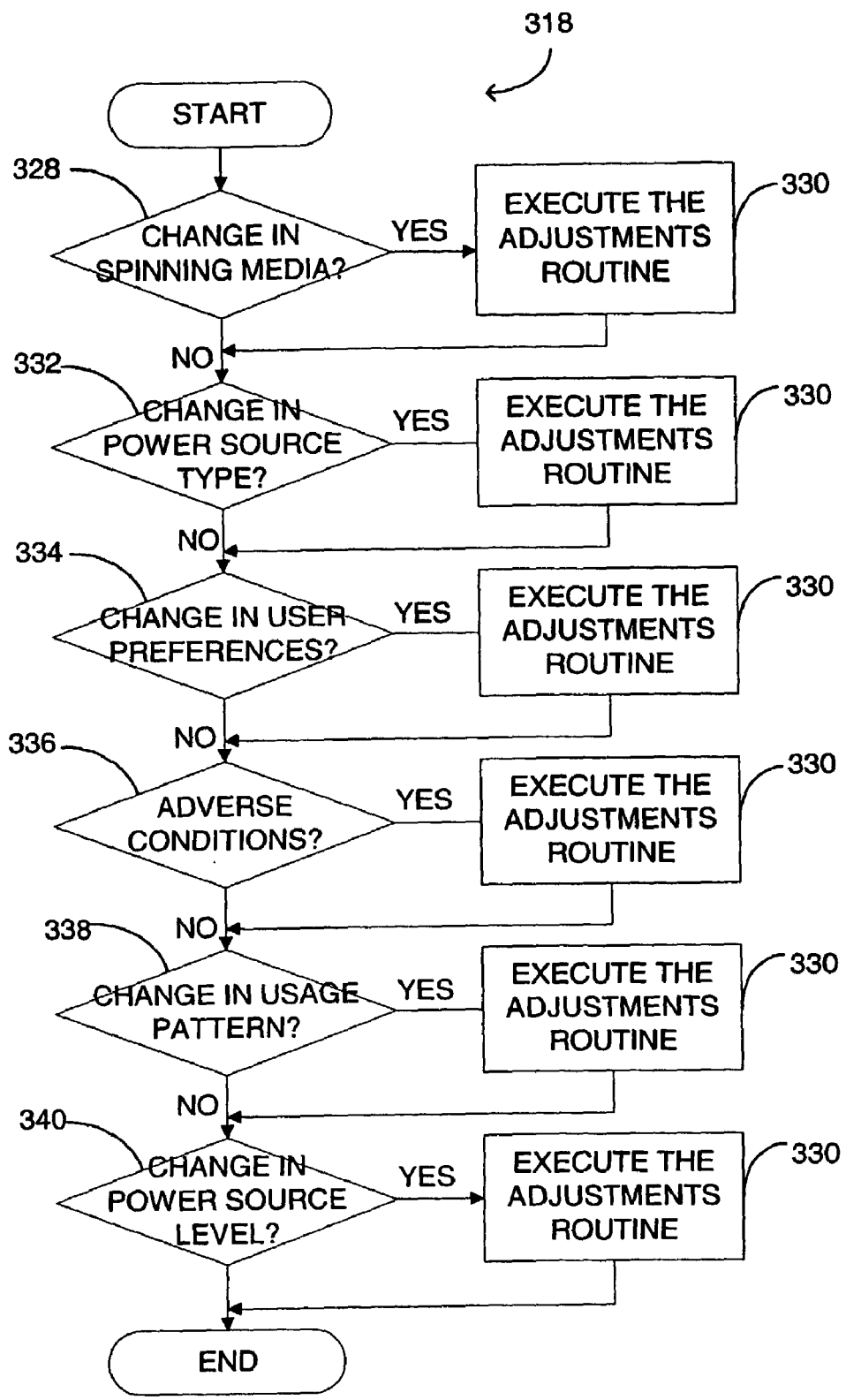
Figure 5C:
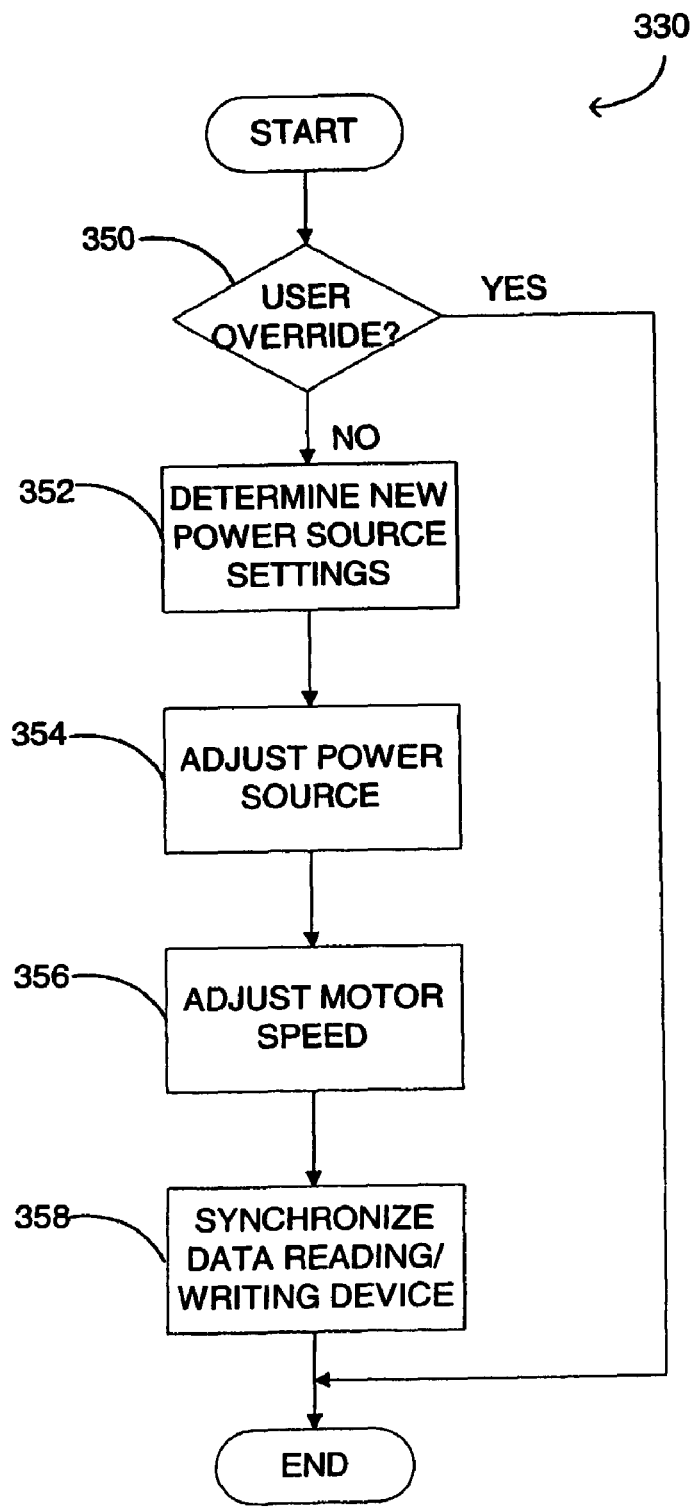

FIG. 5A shows a condition monitoring routine 300 to monitor the operation of the storage device 20 and the power supply 40. At block 302, the condition monitoring routine 300 looks for a presence of a spinning storage medium in the computer 10. The remainder of the condition monitoring routine 300 is performed only if a presence of a spinning storage medium is detected. Upon detection of a spinning storage medium, at block 304, the condition monitoring routine 300 saves the type of the spinning storage medium. The spinning storage medium may be a floppy disk, a CD, a digital versatile disc (DVD), etc. In an alternate implementation the condition monitoring routine 300 may also determine and save other information related to the spinning storage medium, such as the power requirements, size, etc. After collecting information regarding the spinning storage medium, at block 306, the condition monitoring routine 300 determines and saves information regarding the power supply 40. At block 308, the condition monitoring routine 300 determines and saves the level and quality of the power available from the power supply 40.

At block 310 the condition monitoring routine 300 gets the default settings for the power supply 40 and the storage device 20. Generally, such default settings are set by the manufacturer of such devices or by the manufacturer of the computer 10. A user can set overrides to the default settings at the time of the initialization of the computer 10. During the initialization the computer 10 checks such default settings to set the initial settings for the power supply 40 and the storage device 20. At block 312 the condition monitoring routine 300 gets user overrides and other preferences regarding the operation of the power supply 40 and the storage device 20. As mentioned above in description of FIG. 4, user preferences may include information such as whether a user wants the condition monitoring routine 300 to reduce the speed of the storage device at detection of an overheating or not, etc. A user can generally change the user overrides only during the initialization of the computer 10. However, a user can change the user preferences at any point during the operation of the computer 10 and the effect of such changes in the middle of the operation of the condition monitoring routine 300 is further described in the following FIG. 5B.

At this point the condition monitoring routine 300 has obtained necessary information about the storage device 20, the power supply 40 and various user preferences. With this initial set of information, at block 314 the condition monitoring routine 300 sets the initial parameters for operation of the storage device 20 and the power supply 40. Once the initial operating parameters are set, the condition monitoring routine 300 performs a changes monitoring routine 318 for monitoring the changes in various conditions that may require changing of the operation of the storage device 20 and the power supply 40. The operation of the changes monitoring routine 318 is described in further detail in FIG. 5B. At block 320, the condition monitoring routine 300 determines if an abort instruction has been received to abort the operation of the condition monitoring routine 300. If such an abort instruction is received, the operation of the condition monitoring routine 300 ends.

FIG. 5B shows an exemplary functioning of the changes monitoring routine 318 which determines what changes need to be made to the operation of the storage device 20 and the power supply 40 based on changes to various operating conditions, user preferences, etc. At block 328, the changes monitoring routine 318 determines if there is any change to the storage medium 230. Such a change may be, for example, a change from a floppy disk drive to a CD drive, etc. If such a change is detected the changes monitoring routine 318 performs an adjustment routine 330. The adjustment routine 330 receives information from the changes monitoring routine 318 regarding any changes detected by the changes monitoring routine 318 and determines the new settings for the storage device 20 and the power supply 40. The operation of the adjustment routine 330 is further described in more detail in FIG. 5C.

At block 332 the changes monitoring routine 318 determines if there was any change in the type of power supply 40. Such a change may be, for example, a change from a battery operated power supply 40 to a commercial power supply 40 supplied through a standard power outlet, etc. If a change in the type of the power supply 40 is detected, the changes monitoring routine 318 runs the adjustment routine 330. Similarly, at block 334, the changes monitoring routine 318 determines if there was any change in any user preferences regarding the operation of the storage device 20 and the power supply 40. Such a change in user preference may require, for example, the storage medium 20 to operate at a full speed irrespective of the condition of the power supply 40. If a change in a user preference is detected, the changes monitoring routine 318 runs the adjustment routine 330.

At block 336, the changes monitoring routine 318 determines if there was any adverse condition detected that may affect the performance or the operating condition of either the storage medium 20 or the power supply 40. An example of such an adverse condition may be, for example, an increase in the temperature of the storage device, a decrease in the life of a battery used as the power supply 40, etc. If an adverse condition is detected, the changes monitoring routine 318 runs the adjustment routine 330. After evaluating an existence of an adverse condition, at block 338, the changes monitoring routine 318 determines whether there was any change in a usage pattern of the storage device 20. Such a change in the usage pattern of the storage device 20 may be, for example, an above average writing or reading of data on the storage device 20. If a change in the usage pattern in detected, the changes monitoring routine 318 runs the adjustment routine 330 to reconfigure the operation of the storage device 20 and the power supply 40, if necessary.

At block 340, the changes monitoring routine 318 determines if there is any change in the level of power available from the power supply 40. Such a change may be detected in the form of a reduction in the voltage level, a reduction in the current level, etc., of the power available from the power supply 40. Upon detection of a change in the level of the power available from the power supply 40, the changes monitoring routine 318 runs the adjustment routine 330.

The operation of the changes monitoring routine 318 is described in FIG. 5B by using blocks 328 to 340 that determine various changes in the operating conditions of the storage device 20 and the power supply 40. However, a person of ordinary skill in the art can appreciate that not all of these blocks are necessary, or that in an alternate embodiment, other blocks to determine a different change in the operating condition of the storage device 20 or the power supply 40 may also be provided.

FIG. 5C illustrates an exemplary flowchart of the adjustment routine 330, which may be called from various points within the changes monitoring routine 318 as described above. At block 350, the adjustment routine 330 determines if there is a user override present that instructs the adjustment routine 330 to ignore a change in a condition that caused the changes monitoring routine 318 to invoke the adjustment routine 330. For example, there may be a user override specified by a user that instructs the adjustment routine 330 to keep the speed of the storage device 20 at a given level even if a change in the available bandwidth of the communications bus 30 above any threshold level is detected. In such a case, when the changes monitoring routine 318 calls the adjustment routine 330 due to an decrease in the available bandwidth of the communications bus 30, the adjustment routine 330 will not perform any change in the operation of the storage device 20 and the power supply 40.

If no user override is detected at block 350, at block 352, the adjustment routine 330 determines a new power supply level. The determination of the new power supply level takes into account a number of parameters including user preferences, usage patterns, other system level conditions within the computer 10, etc. For example when the adjustment routine 330 is called by the changes monitoring routine 318 upon detection of a change in the type of power supply 40 from a commercial power supply to a battery supported power supply, the adjustment routine 330 may set the power supply level to a maximum if a user preference specifies so. Alternatively, if there is no user preference specified, and an analysis of the usage pattern indicates that the storage device 20 is used very infrequently, the adjustment routine 330 may set the power supply level to a lower level so that more power is available to other parts of the computer 10.

After determining the new power supply settings, at block 354, the adjustment routine 330 adjusts the power supply 40 to the new setting levels. At block 356, the adjustment routine 330 adjusts the speed of the motor 210 within the storage device 20 to a level corresponding to a new power level of the power supply 40. Subsequently, at block 358, the adjustment routine 330 adjusts the speed of the data reading/writing device 220 to synchronize it with the speed of the rotation of the motor 210.

Although certain apparatuses constructed in accordance with the teachings of this disclosure and certain methods in line with the teachings of this disclosure have been described herein, the scope of coverage of this patent is not limited thereto. On the contrary, this patent covers all embodiments of the teachings of this disclosure fairly within the scope of the appended claims, either literally or under the doctrine of equivalents.

What is claimed is:

1. A storage device comprising:
   a storage medium;
   a motor to spin the storage medium;
   a data reading device to read data from the storage medium;
   a usage pattern monitor adapted to generate and store usage pattern maps specifying relations between a plurality of data locations on the storage medium and (1) at least one of frequency of read operations performed at the data locations and frequency of write operations performed at the data locations and (2) density of data at the data locations, and to generate a usage pattern signal based on the usage pattern maps; and
   the control circuit further responsive to the usage pattern signal to: (a) change a level of power delivered to the motor to change a speed of rotation of the storage medium from a first speed to a second speed, and (b) to synchronize operation of the data reading device to the second speed of rotation of the storage medium.

2. A storage device as defined in claim 1, further comprising a user preference monitor adapted to receive a plurality of user preferences specifying operation of the storage medium, wherein the plurality of user preferences include at least one of: (1) a maximum speed of the motor; and (2) a relation between the speed and temperature of the motor; and
   a control circuit responsive to at least one of the plurality of user preferences to: (a) change level of power delivered to the motor to change a speed of rotation of the storage medium from a first speed to a second speed, and (b) to synchronize operation of the data reading device to the second speed of rotation of the storage medium.

3. A storage device as defined in claim 1 wherein the storage medium comprises at least one of a magnetic medium and an optical medium.

4. A storage device as defined in claim 1 wherein the data reading device comprises at least one of: a magnetic head, an optical sensor, and an optical transmitter.

5. A storage device as defined in claim 1 wherein the control circuit changes the level of power by changing a level of voltage supplied to the motor.

6. A storage device as defined in claim 1 wherein the control circuit synchronizes the operation of the data reading device by changing a reading rate of the data reading device to correspond to the speed of rotation of the storage medium.

7. A storage device as defined in claim 1 wherein the control circuit is further responsive to a first predetermined condition comprising at least one of: (a) an adverse condition associated with the storage device; (b) availability of a commercial power source; and (c) a battery condition.

8. A storage device as defined in claim 7 wherein the adverse condition comprises temperature above a predetermined level.

9. A storage device as defined in claim 2 wherein the control circuit is further responsive to a second predetermined condition comprising removal of the first predetermined condition.

10. A storage device as defined in claim 1 further comprising a data writing device, wherein the control circuit is responsive to the first predetermined condition to synchronize operation of the data writing device to the second speed of rotation of the storage medium.

11. A storage device a defined in claim 1 wherein the data reading device comprises a data writing device.

12. A storage device as defined in claim 11 wherein the control circuit is responsive to a second predetermined condition to: (a) change the level of power delivered to the motor to change the speed of rotation of the storage medium from the second speed to the first speed, and (b) to synchronize operation of the data writing device to the first speed of rotation of the storage medium.

13. A method of controlling power consumption in a computer having a storage device including a motor and a storage medium, the method comprising:
supplying a first power level to the motor of the storage device to spin the storage medium at a first rotational velocity;
generating and storing usage pattern maps specifying relations between a plurality of data locations on the storage medium and (1) at least one of frequency of read operations performed at the data locations and frequency of write operations performed at the data locations and (2) density of data at the data locations,
generating a usage pattern signal based on the usage pattern maps; and
responsive to the usage pattern signal, supplying a second power level to the motor of the storage device to spin the storage medium at a second rotational velocity.

14. A method as defined in claim 13 further comprising synchronizing operation of a data reading device to the second rotational velocity of the storage medium.

15. A method as defined in claim 14 wherein the data reading device comprises a data writing device.

16. A method as defined in claim 14 wherein the storage device comprises at least one of a magnetic medium and an optical medium.

17. A method as defined in claim 14 wherein the data reading device comprises at least one of: a magnetic head, an optical sensor, and an optical transmitter.

18. A method as defined in claim 13 wherein supplying a second power level comprises supplying a second level of voltage to the motor of the storage device to spin the storage medium at the second rotational velocity.

19. A method as defined in claim 13 further comprising detecting a first predetermined condition, wherein the first predetermined condition comprises at least one of: (a) an adverse condition associated with the storage device; (b) availability of a commercial power source; and (c) a battery condition.

20. A method as defined in claim 19 wherein the plurality of user preferences include at least one of: (1) a maximum speed of the motor; and (2) a relation between the speed and temperature of the motor.

21. A method as defined in claim 15 further comprising:
detecting a second predetermined condition;
in response to the detection of the second predetermined condition, supplying the first power level to the motor of the storage device to change the rotational velocity of the storage medium from the second rotational velocity to the first rotational velocity, and
synchronizing operation of the data reading device to the first rotational velocity of the storage medium.

22. A method as defined in claim 21 wherein the data reading device comprises a data writing device.

23. A computer comprising:
a storage device having a storage medium, a motor to spin the storage medium, and a data reading device;
a user pattern monitor adapted to generate and store usage pattern maps specifying relations between a plurality of data locations on the storage medium and (1) at least one of frequency of read operations performed at the data locations and frequency of write operations performed at the data locations and (2) density of data at the data locations, and to generate a usage pattern signal based on the usage pattern map; and
a control circuit in communication with the storage device to control power delivery to the motor to control power consumption based on the usage pattern signal.

24. A computer as defined in claim 23 wherein the storage medium comprises at least one of a magnetic medium and an optical medium.

25. A computer as defined in claim 23 wherein the data reading device comprises at least one of: a magnetic head, an optical sensor, and an optical transmitter.

26. A computer as defined in claim 23 wherein the control circuit controls delivery of power to the motor by controlling a level of voltage supplied to the motor.

27. A computer as defined in claim 23 wherein the control circuit synchronizes a reading rate of the data reading device with a speed of rotation of the storage medium.

28. A computer as defined in claim 23, further comprising a user preference monitor adapted to receive and store a plurality of user preferences specifying operation of the storage medium, wherein the plurality of user preferences include at least one of: (1) a maximum speed of the motor; and (2) a relation between the speed and temperature of the motor; and
a control circuit responsive to at least one of the plurality of user preferences to: (a) change a level of power delivered to the motor to change a speed of rotation of the storage medium from a first speed to a second speed, and (b) to synchronize operation of the data reading device to the second speed of rotation of the storage medium.

29. A computer as defined in claim 23 wherein die data reading device comprises a data writing device.

30. A computer as defined in claim 29 wherein the control circuit synchronizes operation of the data writing device with a speed of the rotation of the storage medium.

31. A computer as defined in claim 23 further comprising a data writing device, wherein the control circuit synchronizes operation of the data writing device with a speed of rotation of the data storage medium.

32. For use with a storage device having a motor for rotating a storage medium and a data reading device, a computer program embodied on a tangible medium comprising:
first software to generate and store usage pattern mans specifying relations between a plurality of data locations on the storage medium and (1) at least one of frequency of read operations performed at the data locations and frequency of write operations performed at the data locations and (2) density of data at the data locations, and to generate a usage pattern signal based on the usage pattern map;
second software responsive to the usage pattern signal to set a level of power delivered to the motor to change a speed of rotation of the storage medium; and
third software responsive to the usage pattern signal to adjust a rate of operation of the data reading device.

33. A computer program as defined in claim 32, further comprising a fourth software to receive a plurality of user preferences specifying operation of the storage medium; wherein the plurality of user preferences include at least one of: (1) a maximum speed of the motor; and (2) a relation between the speed and temperature of the motor; and a fifth software responsive to at least one of the plurality of user preferences to: (a) change a level of power delivered to the motor to change a speed of rotation of the storage medium from a first speed to a second speed, and (b) to synchronize operation of the data reading device to the second speed of rotation of the storage medium.

34. A computer program as defined in claim 33 further conspiring:

sixth software to detect another of the plurality of user preferences;

seventh software responsive to the another of the plurality of user preferences to: (a) change the level of power delivered to the motor to change the speed of rotation of the storage medium, and (b) to synchronize operation of the data reading device to the speed of rotation of the storage medium.

35. For use with a storage device having a motor for rotating a storage medium and a reading device, an apparatus comprising:

a user pattern monitor adapted to generate and store usage pattern maps specifying relations between a plurality of data locations on the storage medium and (1) at least one of frequency of read operations performed at the data locations and frequency of write operations performed at the data locations and (2) density of data at the data locations, and to generate a usage pattern signal based on the usage pattern map;

a power manager responsive to usage pattern signal to set a level of power delivered to the motor to change a speed of rotation of the storage medium; and a first rate controller responsive to the power manager to adjust a rate of operation of the data reading device.

36. An apparatus as defined in claim 35, further comprising a user preference monitor to receive a plurality of user preferences specifying operation of the storage medium wherein the plurality of user preferences include at least one of: (1) a maximum speed of the motor; and (2) a relation between the speed and temperature of the motor; and a control circuit responsive to at least one of the plurality of user preferences to: (a) change a level of power delivered to the motor to change a speed of rotation of the storage medium from a first speed to a second speed, and (b) to synchronize operation of the data reading device to the second speed of rotation of the storage medium.

37. An apparatus as defined in claim 36 wherein the rate controller is responsive to the power manager to adjust a rate of operation of a data writing device.

38. An apparatus as defined in claim 36 wherein the power manager sets the level of power delivered to the motor by changing a voltage level delivered to the motor.

\* \* \* \* \*

UNITED STATES PATENT AND TRADEMARK OFFICE
CERTIFICATE OF CORRECTION

PATENT NO.        : 7,068,456 B2
APPLICATION NO. : 10/315441
DATED             : June 27, 2006
INVENTOR(S)       : Michael C. Walz It is certified that error appears in the above-identified patent and that said Letters Patent is hereby corrected as shown below:

At Column 10, line 33, "change level" should be -- change a level --.

At Column 11, line 3, "device a defined" should be -- device as defined --.

At Column 11, line 60, "velocity," should be --velocity; --.

At Column 12, line 38, "die" should be -- the --.

At Column 12, line 51, "mans" should be -- maps --.

At Column 13, line 11, "conspiring" should be -- comprising --.

Signed and Sealed this

Twenty-fourth Day of April, 2007

JON W. DUDAS
*Director of the United States Patent and Trademark Office*